US012103028B2

(12) United States Patent
Buckel, Jr. et al.

(10) Patent No.: US 12,103,028 B2
(45) Date of Patent: Oct. 1, 2024

(54) APPLICATION APPARATUS FOR A COATINGS MATERIAL

(71) Applicant: SWIMC LLC, Cleveland, OH (US)

(72) Inventors: Charles T. Buckel, Jr., Valley City, OH (US); Sharad Gaurav, Lakewood, OH (US); Edward Ray Goodwin, Jr., Westlake, OH (US); Christopher S. Haber, Brunswick, OH (US); Michael C. Lambertson, Jr., Aurora, OH (US); Hongbing Lai, Cleveland, OH (US); Victor J. Levand, Lyndhurst, OH (US); Yandong Shen, Guangdong (CN); Robert A. Siegrist, North Royalton, OH (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 18/317,434

(22) Filed: May 15, 2023

(65) Prior Publication Data

US 2023/0356254 A1 Nov. 9, 2023

Related U.S. Application Data

(63) Continuation of application No. 17/689,356, filed on Mar. 8, 2022, now Pat. No. 11,684,944.

(Continued)

(51) Int. Cl.
*B05C 1/08* (2006.01)
*B05C 17/02* (2006.01)

(52) U.S. Cl.
CPC ........ *B05C 1/0808* (2013.01); *B05C 17/0217* (2013.01)

(58) Field of Classification Search
None
See application file for complete search history.

(56) References Cited

U.S. PATENT DOCUMENTS 2,817,107 A * 12/1957 Zellinger .............. B05C 17/022 15/230.11
3,604,046 A 9/1971 Taylor
(Continued)

FOREIGN PATENT DOCUMENTS

CN 206382188 U 8/2017
CN 211637183 U 10/2020
(Continued)

OTHER PUBLICATIONS

"Rollingdog 12-18", Amazon.com, Feb. 5, 2022, [retrieved online] <https://www.amazon.com/ROLLINGDOG-Adjustable-Aluminum-Brushing-Extension/dp/B08CKRG46W/ref=dp_prsubs_1?pd_rd_i=B08CKRG46W&psc=1>, 10 bages.
(Continued)

*Primary Examiner* — Jethro M. Pence
(74) *Attorney, Agent, or Firm* — Tucker Ellis LLP

(57) ABSTRACT

Provided is an application apparatus for a coatings material. The application apparatus includes a supporting element extending along a first axis and having a first end and a second end. A first arm is coupled to the first end of the supporting element, and a second arm coupled to the second end of the supporting element. A first fastener attached to, and movable with respect to, the first end of the supporting element and detachably fixed to the first arm. Further, the first arm is configured to slide along the first axis.

20 Claims, 5 Drawing Sheets

Related U.S. Application Data

(60) Provisional application No. 63/158,046, filed on Mar. 8, 2021.

(56) References Cited

U.S. PATENT DOCUMENTS

| | | | | |
|---|---|---|---|---|
| 3,623,180 | A * | 11/1971 | Anderson | B05C 17/02 15/230.11 |
| 3,685,084 | A * | 8/1972 | Bennett | B05C 17/02 15/230.11 |
| 3,776,645 | A | 12/1973 | Walker | |
| 3,822,948 | A | 7/1974 | Handl | |
| 3,824,024 | A | 7/1974 | Mason | |
| 3,877,823 | A | 4/1975 | Leland | |
| 3,937,583 | A | 2/1976 | Tyson et al. | |
| 3,970,396 | A | 7/1976 | Brady | |
| 3,986,226 | A | 10/1976 | Roe et al. | |
| 4,038,716 | A | 8/1977 | Polsfuss | |
| 4,100,642 | A * | 7/1978 | Gabor | A46B 15/00 15/230.11 |
| 4,196,491 | A | 4/1980 | Baril | |
| 4,337,002 | A | 6/1982 | Martucci | |
| 4,356,588 | A | 11/1982 | Martucci | |
| 4,478,671 | A | 10/1984 | Freeman | |
| 4,555,195 | A | 11/1985 | de Vreeze et al. | |
| 4,765,353 | A | 8/1988 | Rhoades | |
| 4,889,440 | A | 12/1989 | Shano | |
| 5,050,261 | A | 9/1991 | Hofacker | |
| 5,123,768 | A | 6/1992 | Franklin | |
| 5,186,674 | A | 2/1993 | Beckhusen et al. | |
| 5,207,755 | A | 5/1993 | Ampian | |
| 5,769,769 | A | 6/1998 | Torntore | |
| 5,806,131 | A | 9/1998 | Tennant | |
| 5,846,176 | A | 12/1998 | Zieger et al. | |
| 5,903,952 | A | 5/1999 | Camp, Jr. et al. | |
| 5,921,905 | A | 7/1999 | Newman, Jr. et al. | |
| 5,960,511 | A | 10/1999 | Boyce | |
| 6,219,877 | B1 | 4/2001 | Lowrey et al. | |
| 6,519,800 | B2 | 2/2003 | Newman et al. | |
| 6,681,438 | B2 | 1/2004 | Newman et al. | |
| 6,922,866 | B2 | 8/2005 | Er | |
| 7,007,337 | B2 | 3/2006 | Finochiaro et al. | |
| 7,028,363 | B1 | 4/2006 | Gartner | |
| 7,037,018 | B1 | 5/2006 | Shai | |
| 7,162,768 | B1 | 1/2007 | Gartner | |
| 7,340,796 | B2 | 3/2008 | Pyles | |
| 7,523,518 | B2 | 4/2009 | Futo et al. | |
| 7,707,678 | B2 | 5/2010 | Major | |
| 7,761,951 | B1 | 7/2010 | O'Neal, Jr. | |
| 7,779,503 | B2 | 8/2010 | Dale et al. | |
| 7,784,142 | B2 | 8/2010 | Scott, Sr. | |
| 7,827,651 | B2 | 11/2010 | Graham et al. | |
| 8,025,022 | B1 | 9/2011 | Morris | |
| 8,060,975 | B2 | 11/2011 | Williams | |
| 8,235,620 | B2 | 8/2012 | Fisher | |
| 8,413,289 | B1 | 4/2013 | Dondurur et al. | |
| 8,458,848 | B1 | 6/2013 | Dondurur et al. | |
| 8,671,501 | B2 | 3/2014 | Buckel, Jr. et al. | |
| 8,757,914 | B1 | 6/2014 | Megaro et al. | |
| 8,763,198 | B2 | 7/2014 | Thal | |
| 8,821,058 | B2 | 9/2014 | Walker et al. | |
| 8,888,394 | B2 | 11/2014 | Caulier | |
| 9,266,139 | B2 | 2/2016 | Bruggeman et al. | |
| 9,272,304 | B1 | 3/2016 | Emery | |
| 9,339,841 | B2 | 5/2016 | Buckel, Jr. et al. | |
| 9,492,838 | B2 | 11/2016 | Williams | |
| 9,649,656 | B2 * | 5/2017 | Brooks | B25G 1/04 |
| 9,549,608 | B1 | 6/2017 | Emery | |
| 9,907,384 | B2 | 3/2018 | Megaro et al. | |
| 9,975,141 | B2 | 5/2018 | Johnston et al. | |
| 10,086,400 | B2 | 10/2018 | Johnston et al. | |
| 10,195,639 | B2 | 2/2019 | Johnson et al. | |
| 10,279,370 | B2 | 5/2019 | Arvinte et al. | |
| 10,293,363 | B2 | 5/2019 | Mitchell et al. | |
| 10,576,495 | B2 | 3/2020 | Roe | |
| 10,682,667 | B2 | 6/2020 | Page | |
| 10,751,749 | B2 | 8/2020 | Johnson et al. | |
| 10,906,062 | B2 | 2/2021 | Zeller | |
| 10,933,439 | B2 | 3/2021 | Bukovitz et al. | |
| 11,110,486 | B2 | 9/2021 | Gavriely | |
| 11,407,004 | B2 | 8/2022 | Johnson et al. | |
| 11,772,123 | B1 * | 10/2023 | Vancsura | B05C 17/0222 15/257.01 |
| 2002/0142903 | A1 | 10/2002 | Tominaga et al. | |
| 2003/0074759 | A1 | 4/2003 | Er | |
| 2003/0148036 | A1 * | 8/2003 | Fernandez | B44D 3/121 427/428.05 |
| 2004/0168276 | A1 | 9/2004 | Lye | |
| 2006/0045981 | A1 | 3/2006 | Tsushi et al. | |
| 2006/0123578 | A1 | 6/2006 | Rickstrew | |
| 2006/0191088 | A1 | 8/2006 | Goulet et al. | |
| 2007/0003358 | A1 | 1/2007 | Futo et al. | |
| 2007/0067936 | A1 | 3/2007 | Hodges | |
| 2007/0147950 | A1 | 6/2007 | Puczkowski | |
| 2007/0266513 | A1 | 11/2007 | Halker | |
| 2009/0197001 | A1 | 8/2009 | Donegan et al. | |
| 2010/0180817 | A1 * | 7/2010 | Atiya | B05C 17/0242 118/258 |
| 2011/0259264 | A1 | 10/2011 | Cervera | |
| 2012/0087710 | A1 | 4/2012 | Walker et al. | |
| 2012/0087712 | A1 | 4/2012 | Walker et al. | |
| 2012/0117742 | A1 * | 5/2012 | Buckel, Jr. | B05C 17/0217 29/401.1 |
| 2014/0013528 | A1 | 1/2014 | Major | |
| 2014/0026343 | A1 | 1/2014 | Perreault | |
| 2014/0157540 | A1 | 6/2014 | Buckel, Jr. et al. | |
| 2014/0289981 | A1 * | 10/2014 | Denissov | B05C 17/0245 15/118 |
| 2015/0038308 | A1 | 2/2015 | Buckel, Jr. et al. | |
| 2015/0196932 | A1 | 7/2015 | Carlson | |
| 2016/0089690 | A1 * | 3/2016 | Goodwin, Jr. | B05C 17/0205 15/230.11 |
| 2017/0036237 | A1 * | 2/2017 | Warner | B05C 17/0205 |
| 2017/0087583 | A1 * | 3/2017 | Rajala | B05C 17/0225 |
| 2018/0228268 | A1 | 8/2018 | Megaro et al. | |
| 2018/0304300 | A1 | 10/2018 | Arvinte et al. | |
| 2019/0283075 | A1 | 9/2019 | Lambert | |
| 2019/0344305 | A1 | 11/2019 | Clarke et al. | |
| 2021/0219525 | A1 | 7/2021 | O'Keeffe et al. | |
| 2022/0118475 | A1 | 4/2022 | Manchester | |
| 2022/0280965 | A1 | 9/2022 | Buckel, Jr. et al. | |
| 2022/0362800 | A1 | 11/2022 | Hepler | |
| 2023/0201867 | A1 * | 6/2023 | Chaney | B25G 3/08 |

FOREIGN PATENT DOCUMENTS

| | | | |
|---|---|---|---|
| IN | 204234302 | U | 4/2015 |
| IT | 202013902149611 | | 10/2014 |

OTHER PUBLICATIONS

Wooster, Big Ben, Time-Saving Tools for Big Jobs Brochure, Oct. 27, 2020, [retrieved online] <https://www.woosterbrush.com/wp-content/uploads/2014/08/BigBenC-201615-1016.pdf>, 1 page.

"Project Select 18in. Yoke Roller Frame", Oct. 27, 2020, [retrieved online] <https://www.pinterest.com/pin/project-select-18-in-yoke-roller-framerf210-the-home-depot-230668812511285331/>, 1 page.

Lowe's, "Purdy 18-in Plastic Standard Paint Roller Frame", Oct. 27, 2020, [retrieved online] <https://www.lowes.com/pd/Purdy-18-in-Plastic-Paint-Roller-Frame/999972024?cm_mmc=shp-_-c-_-prd-_-pnt-_-ggl-_-LIA_PNT_222_Applicators-Tape-Tools-Sprayers-_-999972024-_-local-_-0-_-0&ds_rl=1286981&gclid=EAlalQobChMlusnX6b-C9gIV-vLjBx3RHwJBEAQYASABEgKsJ_D_BwE&gclsrc=aw.ds>, 4 pages.

Sherlock Wide Boy Hulk, The Wooster Brush Company, Oct. 27, 2020, [retrieved online] <https://www.woosterbrush.com/other-tools/roller-frames/sherlock-wide-boy-hulk/>, 2 pages.

(56) References Cited

OTHER PUBLICATIONS

Wide Boy, The Wooster Brush Company, Oct. 27, 2020, [retrieved online] < https://www.woosterbrush.com/other-tools/roller-frames/sherlock-wide-boy/>, 2 pages.

* cited by examiner

APPLICATION APPARATUS FOR A COATINGS MATERIAL

RELATED APPLICATIONS

This application is a continuation application of U.S. Non-provisional application Ser. No. 17/689,356 filed on Mar. 8, 2022, which claims the benefit of U.S. Provisional Application No. 63/158,046 filed on Mar. 8, 2021, each of which is hereby incorporated herein by reference.

TECHNICAL FIELD

In general, the present invention relates to an apparatus and method for applying a coatings material, and more particularly, to an apparatus comprising a non-removable fastener and adjustable arm and methods of applying a coatings material with the apparatus described.

BACKGROUND OF THE INVENTION

A coatings roller assembly has a roller cage rotatably fixed on a wire roller frame. A roller cover can be attached over the roller cage and used to apply coatings materials (e.g., paints, stains varnishes, chemicals, etc.) to a surface. During application of the coatings material, the roller cage and the roller cover, which are supported by the wire roller frame, rotate to distribute the coating.

A roller cover is typically about 22.9 centimeters (9 inches) for at home use. In professional and/or large coatings applications, larger roller covers may be used to increase productivity. Such larger roller covers may vary in size from, for example, 30.5 centimeters (12 inches) to 45.7 centimeters (18 inches). Larger coatings roller assemblies include roller frames that have flexible arms, have removable parts, and are not adjustable.

SUMMARY OF THE INVENTION

In accordance with an embodiment of the present invention, an application apparatus for a coatings material is provided. The application apparatus includes a supporting element extending along a first axis and having a first end and a second end, a first arm coupled to the first end of the supporting element, a second arm coupled to the second end of the supporting element, and a first fastener attached to, and movable with respect to, the first end of the supporting element and detachably fixed to the first arm, wherein the first arm is configured to slide along the first axis.

In accordance with another embodiment of the present invention, application apparatus for a coatings material is provided. The apparatus includes a supporting element extending between a first end and a second end and having a first slot opening to the first end, a first arm coupled to the first end of the supporting element, a second arm coupled to the second end of the supporting element, and a first fastener detachably fixed to the first arm and movable along the first slot allowing the first arm to slide along the supporting element.

In accordance with still another embodiment of the present invention, an application apparatus for a coatings material is provided. The application apparatus includes a supporting element having first and second ends, a first open slot opening to the first end, and a first closed slot proximate to the first end, a first arm operably connected to the first end of the supporting element, a second arm operably connected to the second end of the supporting element opposite to the first end, a first fastener extending through the first arm and first closed slot of the supporting element for coupling the first arm to the supporting element, and a second fastener extending through the first arm and the first open slot of the supporting element for holding the first arm in position, wherein the first arm is configured to slide along the supporting element to increase or decrease the distance between the first arm and the second arm.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
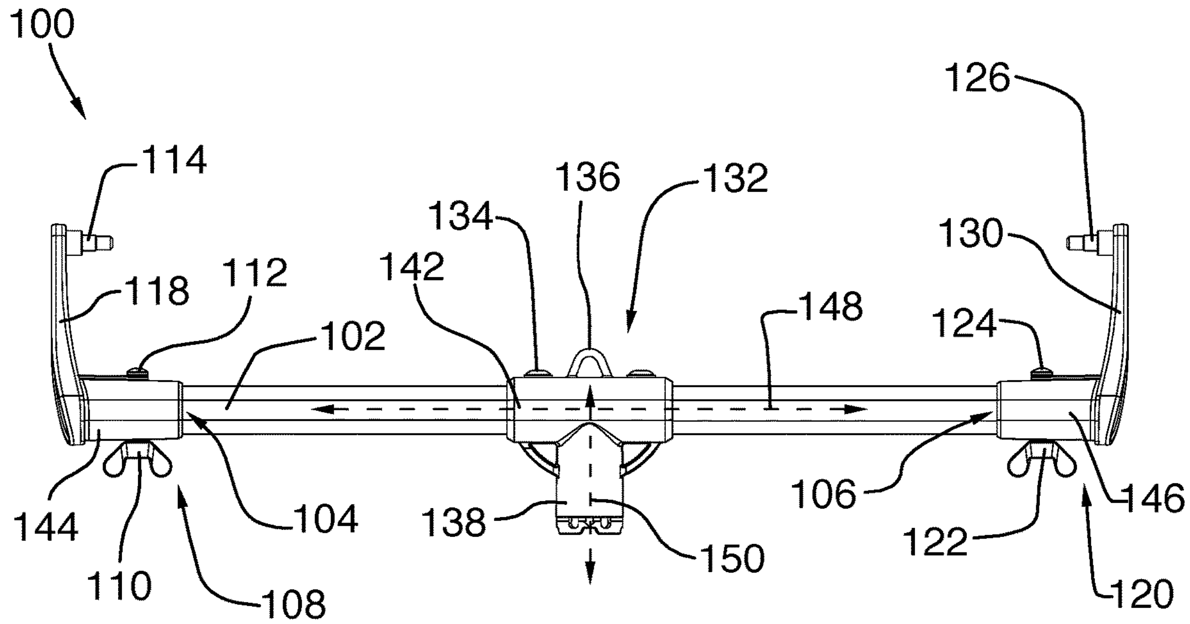
FIG. 1 illustrates a front view of an exemplary application apparatus.

Embodiments of the invention relate to methods and systems that relate to an application apparatus for a coatings material. The application apparatus includes a supporting element extending along a first axis and having a first end and a second end. A first arm is coupled to the first end of the supporting element, and a second arm is coupled to the second end of the supporting element. A first fastener is attached to, and movable with respect to, the first end of the supporting element and detachably fixed to the first arm, wherein the first arm is configured to slide along the first axis.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Turning now to FIG. 1, an exemplary application apparatus is illustrated at reference numeral 100. The application apparatus is provided to accommodate large roller covers (e.g., greater than 30.5 centimeters) to reliably and efficiently apply coatings materials (e.g., paints, stains, varnishes, chemicals, etc.) to a surface, although it will be appreciated that the apparatus may be used with any suitably sized roller cover or other suitable applicator.

The application apparatus includes a supporting element 102 having a first end 104 and a second end 106, a first arm 108 operably connected to the first end 104, a second arm 120 operably connected to the second end 106, and a central connector 132 through which the supporting element 102 extends. The supporting element 102 may extend along a first axis 148 between the first end 104 and the second end 106.

The central connector 132 is operably connected to the supporting element 102 and is arranged between the first arm 108 and the second arm 120. The central connector 132 includes a support portion 142 arranged between the first and second arms 108 and 120 and includes an applicator connector portion 138 extending away from the support portion 142. The support portion 142 may extend along the first axis 148, whereas the applicator connector portion 138 may extend along a second axis 150 substantially perpendicular to the first axis 148. Central fasteners 134 may be used to secure the central connector 132 to the supporting element 102. The applicator connector portion 138 is configured to receive an extension tool such as, for example, a pole or rod designed to aid a user for difficult to reach application areas. The central connector 132 further includes a hanger 136 such that the application apparatus can be stored or displayed on, for example, a hook, screw, or the like. The hanger 136 may resemble a loop or some other suitable structure.

Figure 2:
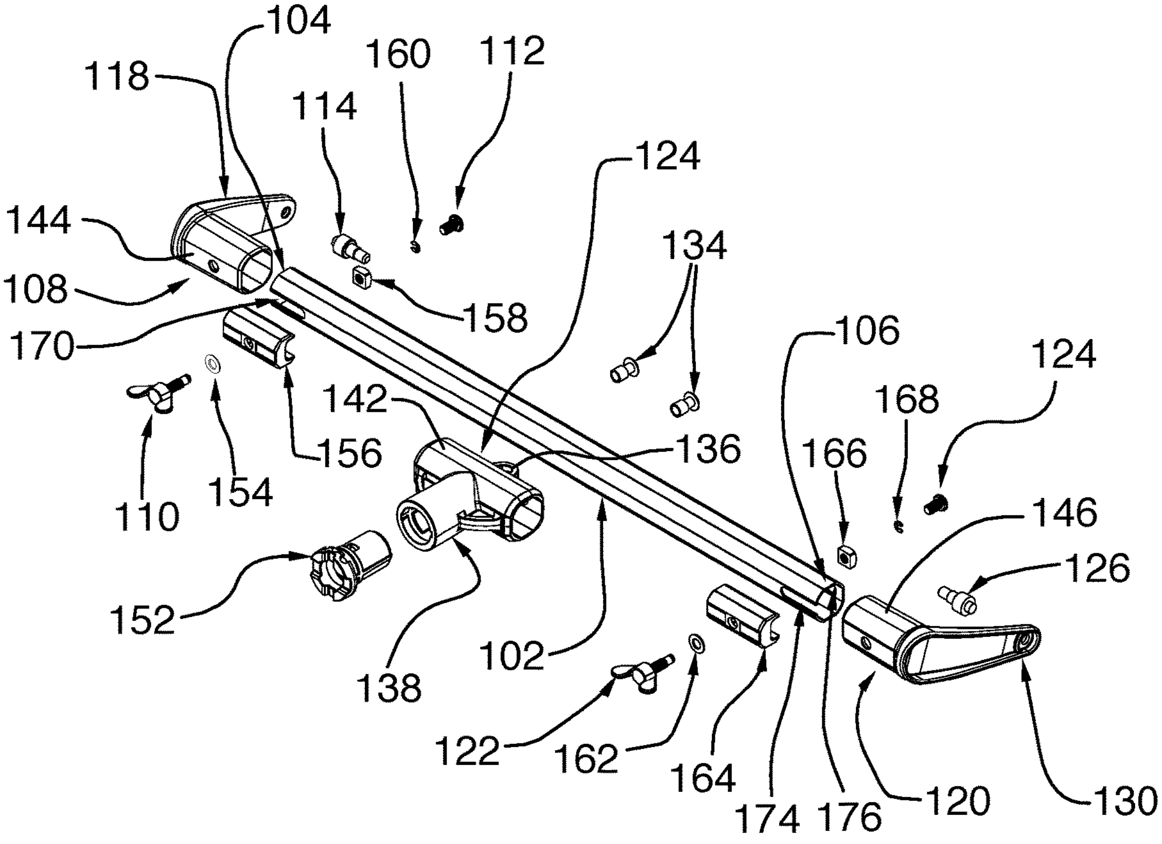
FIG. 2 illustrates an exploded view of the exemplary application apparatus.
Figure 3:
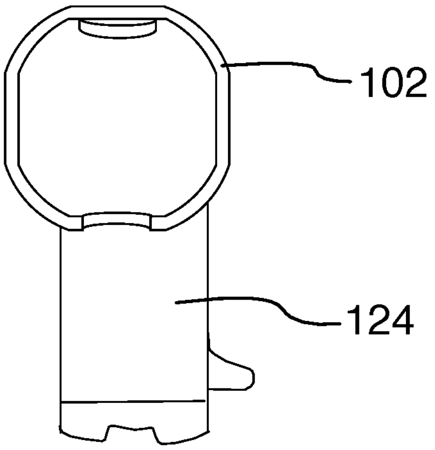
FIG. 3 illustrates a side view of a supporting element of the exemplary application apparatus.

Turning additionally to FIGS. 2-6, the supporting element 102 has an elongate shape extending along a length thereof and may be a single tube with one or more flat sides extending along a length thereof. The at least one flat side provides rigidity to the apparatus by preventing other parts attached to the supporting element 102 from easily loosening and rotating around the supporting element 102. For example, as shown in FIG. 3, the supporting element 102 may have an octagonal cross-section. The tube-structure of the supporting element 102 reduces materials cost and weight of the overall application apparatus, while still providing enough strength to the application apparatus. For example, in some embodiments, the supporting element 102 is configured to stay stiff and not flex when applied with force greater than about one hundred pounds. The supporting element 102 may comprise aluminum, plastic, or other suitable material. Although the supporting element 102 is shown as a single tube, it will be appreciated that in some other embodiments, the supporting element may comprise two or more tubes coupled to one another in a suitable manner. Further, it will be appreciated that the cross-section of the supporting element 102 may exhibit a shape other than an octagon.

It will be appreciated that the first arm 108 and the second arm 120 are substantially the same that the first end 104 and the second end 106 of the supporting element 102 are substantially the same. Thus, FIGS. 4-11 are used to describe both the first arm 108 and the second arm 120 and the first end 104 and the second end 106 of the supporting element 102.

Figure 4:
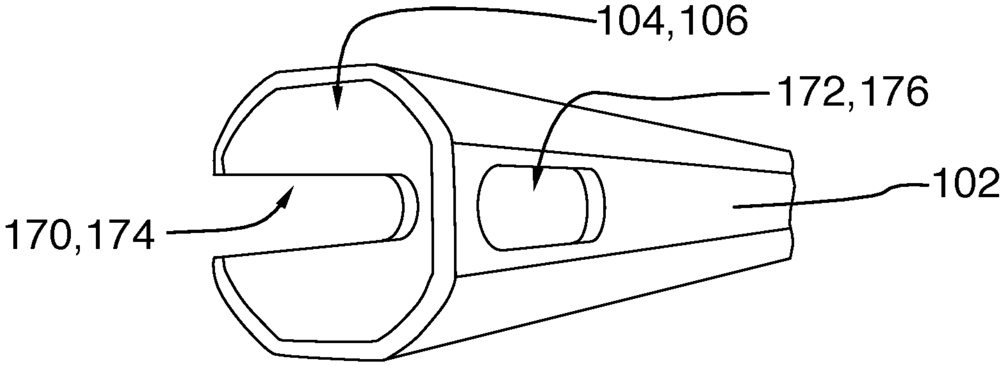
FIGS. 4, 5, and 6 illustrate various magnified views of open and closed slots in the supporting element of the exemplary application apparatus.
Figure 5:
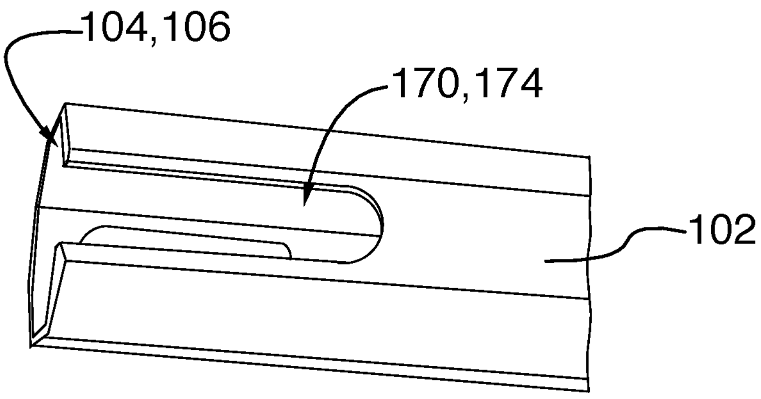
Figure 6:
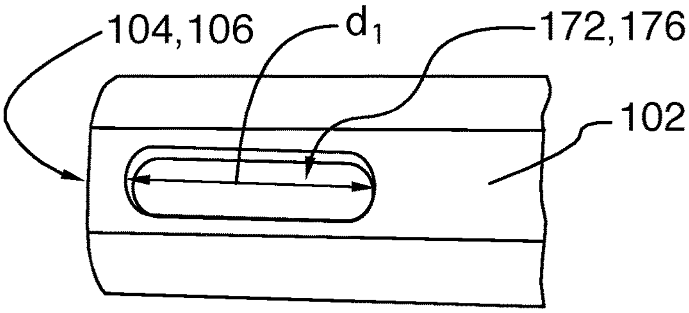

As best shown in FIGS. 2 and 4, the supporting element 102 can include a first open slot 170 opening to the first end 104, a first closed slot 172 at the first end 104, a second open slot 174 opening to the second end 106, and a second closed slot 176 at the second end 106. The closed slots 172 and 176 in the supporting element 102 may be arranged on a side of the supporting element 102 opposite to the open slots 170 and 174. Each open slot 170, 174 has an open side at the respective ends 104, 106 of the supporting element 102 that is configured to slidably receive a fastener as discussed below. The first closed slot 172 and the first open slot 170 provide a passage through the supporting element 102 at the first end 104 in a direction perpendicular to the length of the supporting element 102 for receiving fasteners as discussed below. For example, in some instances, the passage defined by the first closed slot 172 and the first open slot 170 is in a direction parallel to the second axis 150. Similarly, the second closed slot 176 and the second open slot 174 provide a passage through the supporting element 102 at the second end 106 in a direction perpendicular to the length of the supporting element 102 for receiving fasteners as discussed below. For example, in some instances, the passage defined by the second closed slot 176 and the second open slot 174 is in a direction parallel to the second axis 150.

Figure 7:
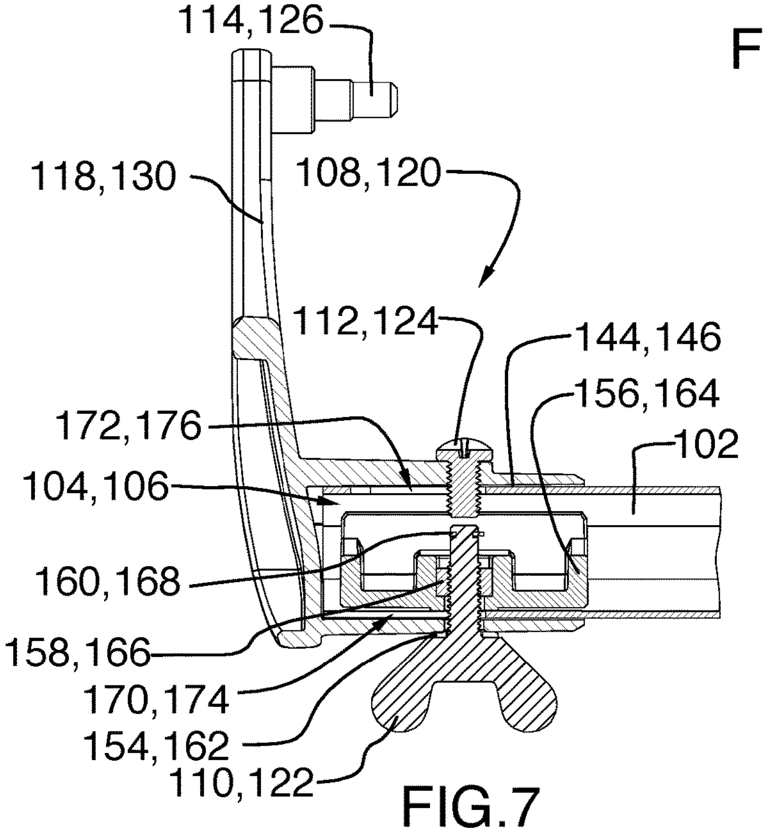
FIG. 7 illustrates a cross-sectional view of an arm coupled to the supporting element of the exemplary application apparatus.
Figure 8:
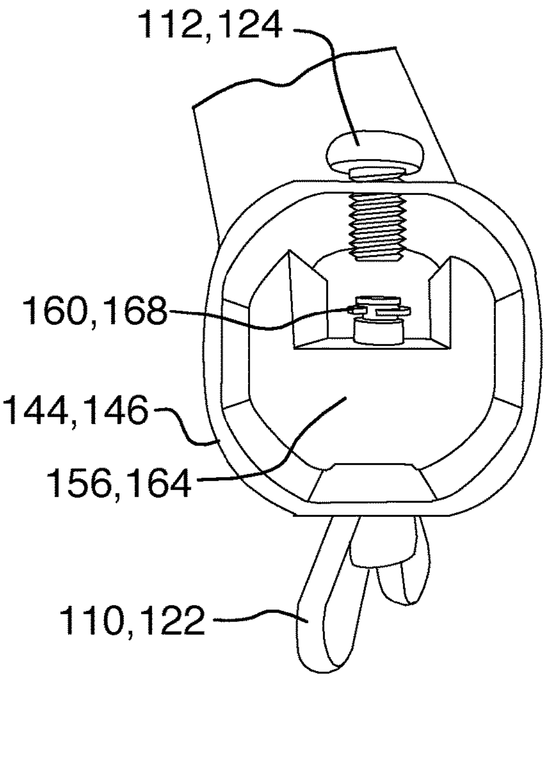
FIG. 8 illustrates a magnified side view of the arm of the exemplary application apparatus.
Figure 9:
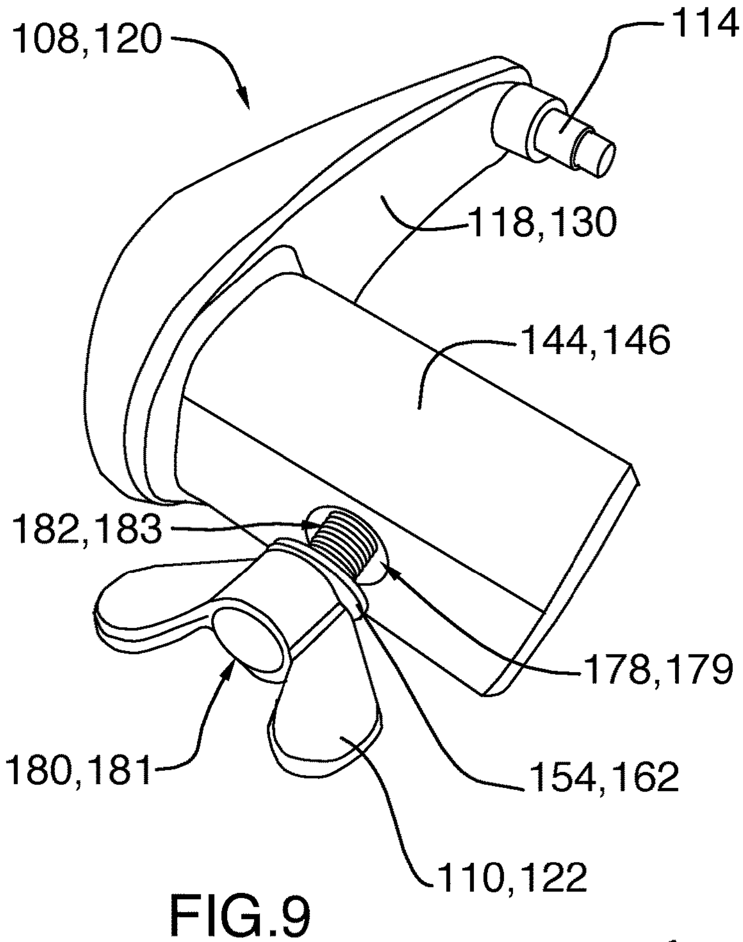
FIG. 9 illustrates a perspective view of first arm of the exemplary application apparatus.
Figure 10:
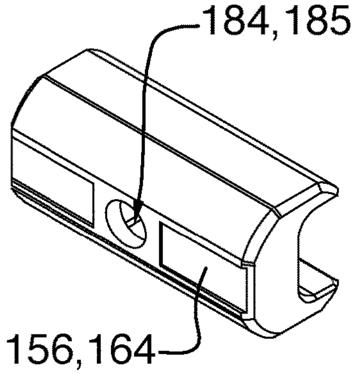
FIG. 10 illustrates a perspective view of a fastener receiving element of the exemplary application apparatus.
Figure 11:
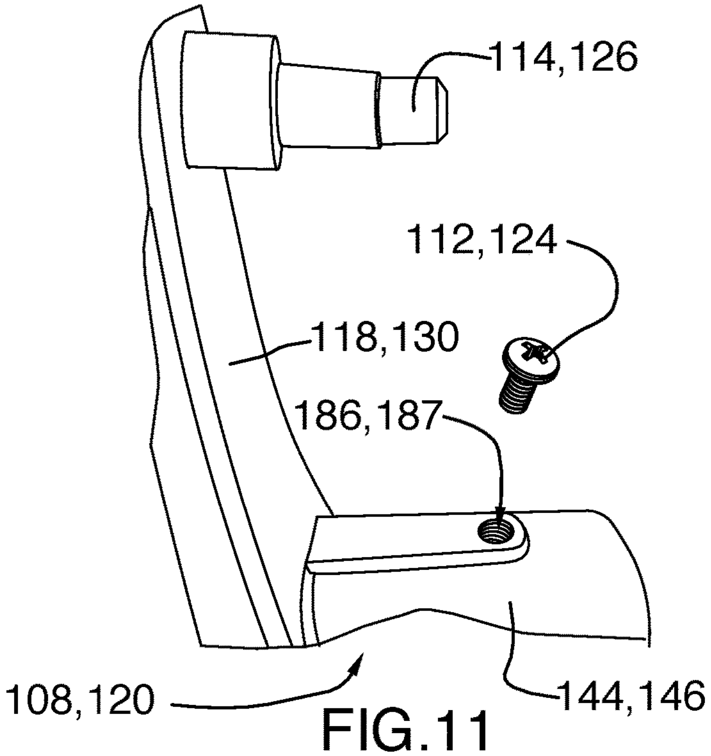
FIG. 11 illustrates another perspective view of the arm of the exemplary application apparatus.

Turning additionally to FIGS. 7 and 8 and the first arm 108 in detail, the first arm 108 includes a first attachment portion 144 configured to receive the first end 104 of the supporting element 102 and a first roller support portion 118 projecting from the first attachment portion 144 in a direction substantially perpendicular to the first attachment portion 144. The first attachment portion 144 of the supporting element 102 is a tube-like structure having a closed end and an open end such that the first attachment portion 144 is configured to surround the supporting element 102 at the first end 104. Thus, a side-view of the first attachment portion 144 of the first arm 108 has substantially the same shape as the cross-sectional profile of the supporting element 102. For example, the cross-sectional profile of supporting element 102 in FIG. 3 is an octagon, and the side-view of the first attachment portion 144 in FIG. 8 is also an octagon such that the first attachment portion 144 can receive the supporting element 102. The first arm 108 further includes a first spindle pin 114 coupled to a free end of the first roller support portion 118 and projecting inward toward the second arm 120 in a direction substantially parallel to the length of the supporting element 102 to accommodate a roller cover for use in a coatings application.

The first arm 108 is operably connected to the supporting element 102 by way of a first fastener 110 and a second fastener 112. The first fastener 110 extends through the first open slot 170 of the first arm 108 the second fastener 112 extends through the first closed slot 172 of the first arm 108. The first fastener 110 is configured to be loosened such that the first arm 108 can slide along the supporting element 102 in a direction towards or away from the second arm 120. The first fastener 110 is configured to be tightened such that the first arm 108 can be fixed at a desired position along the supporting element 102. The first fastener 110 is detachably fixed to the first arm 108 by way of a first retaining clip 160 attached to an end of the first fastener 110 such that the first fastener 110 can be loosened to allow movement of the first arm 108 relative to the supporting element 102 without the first fastener 110 being removed. The second fastener 112 remains in a fixed position with respect to the first arm 108 and slides with the first arm 108 within the closed slot 172 to prevent the first arm 108 from falling off of the supporting element 102 as the position of the first arm 108 is adjusted.

The second fastener 112 may be removed from the apparatus to remove the first arm 108 from the supporting element 102, for example for cleaning.

It will be appreciated that the first fastener 110 could be removed from the first arm 108 by removal of the first retaining clip 160, but such removal of the first retaining clip 160 is difficult and not necessary to remove the first arm 108 from the supporting element 102. Further, to ensure that the first retaining clip 160 does not inadvertently fall off during adjustment of the first fastener 110, the first retaining clip 160 is arranged on an unthreaded portion of the first fastener 110. As such, when the first fastener 110 is completely loose with respect to the first arm 108, the first fastener 110 can spin freely without exerting torque on the first retaining clip 160.

Turning again to FIGS. 7 and 8 and the second arm 120 in detail, the second arm 120 includes a second attachment portion 146 configured to receive the second end 106 of the supporting element 102 and a second roller support portion 130 projecting from the second attachment portion 146 in a direction substantially perpendicular to the second attachment portion 146. The second attachment portion 146 of the supporting element 102 is a tube-like structure having a closed end and an open end such that the second attachment portion 146 is configured to surround the supporting element 102 at the second end 106. Thus, a side-view of the second attachment portion 146 of the second arm 120 has substantially the same shape as the cross-sectional profile of the supporting element 102. For example, the cross-sectional profile of supporting element 102 in FIG. 3 is an octagon, and a side-view of the second attachment portion 146 may also be an octagon such that the second attachment portion 146 can receive the supporting element 102. The second arm 120 further includes a second spindle pin 126 coupled to a free end of the second roller support portion 130 and projecting inward toward the first arm 108 in a direction substantially parallel to the length of the supporting element 102 to accommodate a roller cover for use in a coatings application.

The second arm 120 is operably connected to the supporting element 102 by way of a third fastener 122 and a fourth fastener 124. The third fastener 122 extends through the second open slot 174 of the second arm 120 and the fourth fastener 124 extends through the second closed slot 176 of the second arm 120. The third fastener 122 is configured to be loosened such that the second arm 120 can slide along the supporting element 102 in a direction towards or away from the first arm 108. The third fastener 122 is configured to be tightened such that the second arm 120 can be fixed at a desired position along the supporting element 102. The third fastener 122 is detachably fixed to the second arm 120 by way of a second retaining clip 168 attached to an end of the third fastener 122 such that the third fastener 122 can be loosened to allow movement of the second arm 120 without the third fastener 122 being removed. The fourth fastener 124 remains in a fixed position with respect to the second arm 120 and slides with the second arm 120 within the second closed slot 176 to prevent the second arm 120 from falling off of the supporting element 102 as the position of the second arm 120 is adjusted. The fourth fastener 124 may be removed from the apparatus to remove the second arm 120 from the supporting element 102, for example for cleaning.

It will be appreciated that the third fastener 122 could be removed from the second arm 120 by removal of the second retaining clip 168, but such removal of the second retaining clip 168 is difficult and not necessary to remove the second arm 120 from the supporting element 102. Further, to ensure that the second retaining clip 168 does not inadvertently fall off during adjustment of the third fastener 122, the second retaining clip 168 is arranged on an unthreaded portion of the third fastener 122. As such, when the third fastener 122 is completely loose with respect to the second arm 120, the third fastener 122 can spin freely without exerting torque on the second retaining clip 168.

To accommodate various sized roller covers, the first arm 108 and the second arm 120 are configured to slide relative to the supporting element 102 to increase or decrease a distance between the first and second spindle pins 114 and 126. For example, in some embodiments, the application apparatus is configured to hold roller covers having a length in a range of between about 12 inches and about 18 inches. The roller cover is configured to rotate around an axis defined by the first and second spindle pins 114 and 126 while the first and second spindle pins 114 and 126 remain fixed. Users can easily load and unload roller covers from the first and second spindle pins 114 and 126 as well as adjust the pressure applied to the roller cover according to their preference. As will be discussed further herein, the disclosed application apparatus also comprises strong, yet lightweight materials to increase the reliability and decrease the weight of the application apparatus.

Turning again to FIGS. 2, 7, and 8, the application apparatus further includes a first fastener receiving element 156 configured to receive the first fastener 110 and a second fastener receiving element 164 configured to receive the third fastener 122. A first washer 154 may be arranged between the first fastener 110 and the first fastener receiving element 156, and a first nut 158 is operably connected to the first fastener receiving element 156. Similarly, a second washer 162 may be arranged between the third fastener 122 and the second fastener receiving element 164, and a second nut 166 is operably connected to the second fastener receiving element 164. In other embodiments, the first and second nuts 158 and 166 may instead be integrated into the first and second fastener receiving elements 156 and 164, respectively, such that the first nut 158 and the first fastener receiving element 156 are one piece and the second nut 166 and the second fastener receiving element 164 are one piece.

The first and second fastener receiving elements 156 and 164 each have a side-view profile that resembles the side-view profile of the respective first and second attachment portion 144 and 146 and also the cross-sectional profile of the supporting element 102 preventing rotation around the supporting element 102 upon loosening and tightening of the first and second fasteners 110 and 122. The first and second fastener receiving elements 156 and 164 are sized such that the supporting element 102 can surround the first and second fastener receiving elements 156 and 164 while the respective first and second attachment portion 144 and 146 surrounds the supporting element 102. In other words, the first and second arms 108 and 120 are configured to slidably receive the supporting element 102 such that surfaces of the supporting element 102 are arranged directly between inner surfaces of the attachment portions 144 and 146 and the fastener receiving elements 156 and 164.

When the first fastener 110 is in a tightened configuration, the first arm 108 is fixed to the supporting element 102. The first fastener 110 is tightened to reduce a distance between the first fastener receiving element 156 and portions of the first attachment portion 144 such that the supporting element 102 is sandwiched and secured between the first fastener receiving element 156 and the first attachment portion 144 of the first arm 108. As can be best seen in FIGS. 2 and 7, the first fastener receiving element 156 has a length that is similar to or the same as the length of the first attachment portion 144 of the first arm 108. When the first fastener 110 is in the tightened configuration, a larger area of the supporting element 102 is compressed between the first fastener receiving element 156 and the first attachment portion 144 to improve stability of the first arm 108 on the supporting element 102.

When the first fastener 110 is in a loosened configuration, the first arm 108 can slide along the supporting element 102. The first fastener 110 is loosened to increase a distance between the first fastener receiving element 156 and portions of the first attachment portion 144 such that the supporting element 102 is no longer compressed between the first fastener receiving element 156 and the first attachment portion 144. Due to the presence of the first retaining clip 160, the first fastener 110 is not at risk of being inadvertently removed and lost from the apparatus. The distance that the first arm 108 can move along the supporting element 102 is limited by the dimensions of the first closed slot 172.

Turning additionally to FIGS. 7-11, the first arm 108 includes a first hole 178 configured to receive the first fastener 110. The first fastener 110 includes a first adjustment element 180 configured to be manipulated by a user or a tool to loosen and tighten the first fastener 110 and a first shank 182 extending therefrom through the first hole 178 and through a second hole 184 of the first fastening receiver element 156. The first retaining clip 160 is then configured to be attached to an end of the first shank 182. In an embodiment, the first fastener 110 may be a wingnut such that the user does not require a screwdriver or other tool for loosening and tightening the first fastener 110. It will be appreciate that the fasteners may be other suitable fasteners, such as a security screw.

The first shank 182 may include threads for mating with corresponding threads on the first nut 158, and the first retaining clip 160 may be arranged on an unthreaded region of the first shank 182, for example at an end of the first shank 182. Additionally or alternatively, the first fastener receiving element 156 may include threads in the second hole 184.

The first arm 108 further includes a third hole 186 that may be arranged opposite to the first hole 178 of the first arm 108. The third hole 186 of the first arm 108 is configured to receive the second fastener 112, and may include threads for engaging corresponding threads on the second fastener 112. As shown in FIG. 8, the first fastener 110 and the second fastener 112 are sized such that when tightened into the first arm 108, the first and second fasteners 110 and 112 do not contact one another. Although the first fastener 110 is illustrated as a wingnut and the second fastener 112 is illustrated as a screw, it will be appreciated that other types of fasteners are also within the scope of this disclosure.

When the first arm 108 receives the first end 104 of the supporting element 102, the second fastener 112 is removed from the first arm 108. To attach the first arm 108 to the supporting element 102, the second fastener 112 is threaded into the third hole 186 to extend through the first closed slot 172 of the first arm 108. The first closed slot 172 limits how much the first arm 108 can slide along the supporting element 102. For example, in some instances, the first closed slot 172 has a length equal to a first distance d1 that may range from, for example, about 1 inch to about 3 inches. It will be appreciated that other values for the first distance d1 are also within the scope of this disclosure.

When the first arm 108 receives the first end 104 of the supporting element 102, the first fastener 110 fits within an opening defined by the first open slot 170 of the supporting element 102. Therefore, the first fastener 110 does not have to be removed to take the first arm 108 on and off the supporting element 102. Further, the supporting element 102 receives the first fastening receiver element 156 such that as the first arm 108 receives the supporting element 102, the supporting element 102 is surrounded by the first arm 108 while the first fastening receiver element 156 is surrounded by the supporting element 102.

Turning now to the attachment of the second arm 120, when the third fastener 122 is in a tightened configuration, the second arm 120 is fixed to the supporting element 102. The third fastener 122 is tightened to reduce a distance between the second fastener receiving element 164 and portions of the second attachment portion 146 such that the supporting element 102 is sandwiched and secured between the second fastener receiving element 164 and the second attachment portion 146 of the second arm 120. As can be best seen in FIGS. 2 and 7, the second fastener receiving element 166 has a length that is similar to or the same as the length of the second attachment portion 146 of the second arm 120. When the third fastener 122 is in the tightened configuration, a larger area of the supporting element 102 is compressed between the second fastener receiving element 164 and the second attachment portion 146 to improve stability of the second arm 120 on the supporting element 102.

When the third fastener 122 is in a loosened configuration, the second arm 120 can slide along the supporting element 102. The third fastener 122 is loosened to increase a distance between the second fastener receiving element 164 and portions of the second attachment portion 146 such that the supporting element 102 is no longer compressed between the second fastener receiving element 164 and the second attachment portion 146. Due to the presence of the second retaining clip 168, the third fastener 122 is not at risk being inadvertently removed and lost from the apparatus. The distance that the second arm 120 can move along the supporting element 102 is limited by the dimensions of the second closed slot 176.

Turning again to FIGS. 7-11, the second arm 120 includes a fourth hole 179 configured to receive the third fastener 122. The third fastener 122 includes a second adjustment element 181 configured to be manipulated by a user or a tool to loosen and tighten the third fastener 122 and a second shank 183 extending therefrom through the fourth hole 179 and through a fifth hole 185 of the second fastening receiver element 164. The second retaining clip 168 is then configured to be attached to an end of the second shank 183. In an embodiment, the third fastener 122 may be a wingnut such that the user does not require a screwdriver or other tool for loosening and tightening the third fastener 122. The second shank 183 may include threads for mating with corresponding threads on the second nut 166, and the second retaining clip 168 may be arranged on an unthreaded region of the second shank 183, for example at an end of the second shank 183. Additionally or alternatively, the second fastener receiving element 164 may include threads in the fifth hole 185.

The second arm 120 further includes a sixth hole 187 that may be arranged opposite to the fourth hole 179 of the second arm 120. The sixth hole 187 of the second arm 120 is configured to receive the fourth fastener 124, and may include threads for engaging corresponding threads on the fourth fastener 124. As shown in FIG. 8, the third fastener 122 and the fourth fastener 124 are sized such that when tightened into the second arm 120, the third and fourth fasteners 122 and 124 do not contact one another. Although the third fastener 122 is illustrated as a wingnut and the fourth fastener 124 is illustrated as a screw, it will be appreciated that other types of fasteners are also within the scope of this disclosure.

When the second arm 120 receives the second end 106 of the supporting element 102, the fourth fastener 124 is removed from the second arm 120. To attach the second arm 120 to the supporting element 102, the fourth fastener 124 is threaded into the sixth hole 187 of the second arm 120 to extend through the second closed slot 176 of the second arm 120. The second closed slot 176 limits how much the second arm 120 can slide along the supporting element 102. For example, in some instances, the second closed slot 176 has a length equal to a first distance d1 that may range from, for example, about 1 inch to about 3 inches. It will be appreciated that other values for the first distance d1 are also within the scope of this disclosure.

When the second arm 120 receives the second end 106 of the supporting element 102, the third fastener 122 fits within an opening defined by the second open slot 174 of the supporting element 102. Therefore, the third fastener 122 does not have to be removed to take the second arm 120 on and off the supporting element 102. Further, the supporting element 102 receives the second fastening receiver element 164 such that as the second arm 120 receives the supporting element 102, the supporting element 102 is surrounded by the second arm 120 while the second fastening receiver element 164 is surrounded by the supporting element 102.

Figure 12:
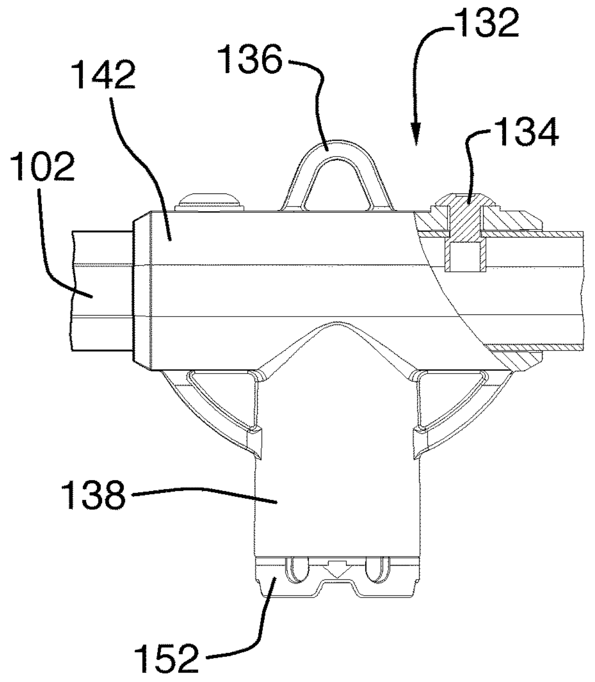
FIG. 12 illustrates a partial cross-sectional view of a connector portion of the exemplary application apparatus.
Figure 13:
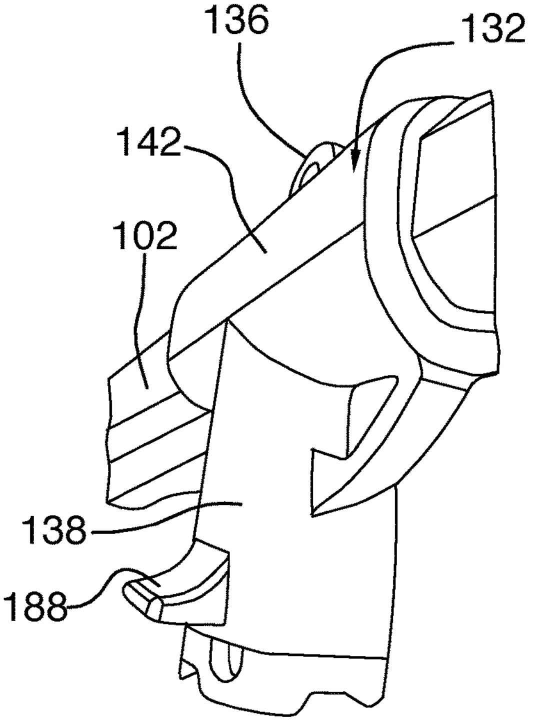
FIG. 13 illustrates a perspective view of the connector portion of the exemplary application apparatus.

Turning to FIGS. 12 and 13, the central fasteners 134 extend through the support portion 142 of the central connector 132 and into the supporting element 102 to fix the central connector 132 to the supporting element 102. In some embodiments, the central fasteners 134 comprise stainless steel or some other suitable material. In some instances, the applicator connector portion 138 includes a fitment piece 152 that is configured to securely receive an extension tool. For example, in some embodiments, the fitment piece 152 is threaded or has a quick connect fitting for an extension tool to be screwed or connected to the central connector 132. In other embodiments, the fitment piece 152 is omitted and the applicator connector portion 138 is one piece and is sized and configured (e.g., threaded) to receive an extension tool. In some embodiments, the central connector 132 comprises a plastic material such as nylon. In other embodiments, the central connector 132 may comprise a suitable lightweight, metal such as a metal, polymer, carbon fiber, fiberglass, plastic, or combinations thereof.

The central connector 132 may further include a tray hook 188 protruding from the applicator connector portion 138. The tray hook 188 is configured to stabilize the application apparatus in a coatings tray such that when the extension pole is removed from the applicator connector portion 138, the application apparatus does not fall into the coatings tray. Thus, the tray hook 188 reduces inadvertent dirtying of the application apparatus. Further, trip hazards caused by the extension pole are mitigated because of the ease of storing the apparatus on the coatings tray by the tray hook 188. The hanger 136 extends away from the support portion 142 of the central connector 132. The hanger 136, the tray hook 188, the applicator connector portion 138, and the support portion 142 of the central connector 132 may be a single piece to provide more rigidity to the central connector 132.

Figure 14:
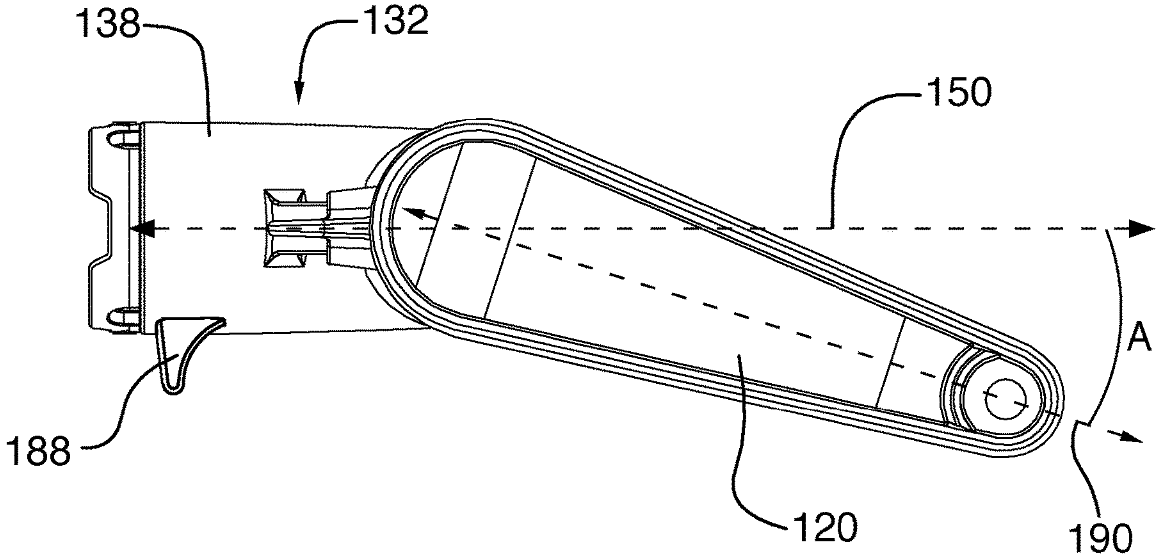
FIG. 14 illustrates a side view of the exemplary application apparatus.

Turning additionally to FIG. 14, a side view of the application apparatus is illustrated, wherein the first axis 148 is extending in and out of the page. The first and second arms 108 and 120 may extend away from the supporting element 102 at a same angle, and thus, only the second arm 120 is visible in FIG. 14. It will be appreciated that the first arm 108 and the supporting element 102 are arranged behind the second arm 120 in FIG. 14.

The first and second arms 108 and 120 extend away from the supporting element 102 in a first direction 190. The first direction 190 is not perpendicular to the first axis 148 and is not perpendicular to the second axis 150. Thus, the first and second axes 148 and 150 form a first plane, and the first direction 190 intersects the first plane. The first direction 190 intersects the first plane at an acute angle A, which may be equal to about 18 degrees, for example. In some other embodiments, angle A may be equal to a value in a range of between, for example, approximately 15 degrees and approximately 25 degrees. The angled first and second arms 108 and 120 improve the ease of applying the coating to a surface and provide better visibility for the user to see the surface being coated than compared to if the first direction 190 were perpendicular to the first axis 148.

To provide reliable strength to the roller cover arranged on the first and second spindle pins 114 and 126, the application apparatus comprises strong yet lightweight materials. For example, in some embodiments, the supporting element 102 comprises an aluminum tube. In other embodiments, it will be appreciated that the supporting element 102 may comprise a metal, polymer, carbon fiber, fiberglass, plastic, wood, or combinations thereof. In some embodiments, the first and second arms 108 and 120 comprise a lightweight material such as, for example, aluminum. More specifically, in some embodiments, the first and second arms 108 and 120 comprise cast aluminum or some other suitable material which is not limited to a metal (e.g., a polymer, carbon fiber, fiberglass, plastic, wood, etc.). In some embodiments, the first, second, third, and fourth fasteners 110, 112, 122 and 124 comprise a metallic material for reliable threading and unthreading. In some such embodiments, the first, second, third, and fourth fasteners 110, 112, 122, and 124 may comprise stainless steel or some other suitable material. In some embodiments, the first and second spindle pins 114 and 126 comprise a metal, polymer, carbon fiber, fiberglass, plastic, or combinations thereof. For example, in some embodiments, the first and second spindle pins 114 and 126 may comprise nylon and stainless steel. Thus, even when the roller cover supported by the application apparatus becomes heavier after coating the roller cover in a coatings material, the strength, yet lightweight materials of the application apparatus still provides reliable support to the roller cover during application of a coatings material to a surface.

The aforementioned systems, components, (e.g., fasteners, arms, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a “means”) used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms “including”, “includes”, “having”, “has”, “with”, or variants thereof are used in the detailed description and/or in the claims, such terms are intended to be inclusive in a manner similar to the term “comprising.”

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms “a”, “an” and “the” include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as “about” is not to be limited to the precise value specified. In some instances, the approximating language may correspond to the precision of an instrument for measuring the value. Moreover, unless specifically stated otherwise, a use of the terms “first,” “second,” etc., do not denote an order or importance, but rather the terms “first,” “second,” etc., are used to distinguish one element from another.

As used herein, the terms “may” and “may be” indicate a possibility of an occurrence within a set of circumstances; a possession of a specified property, characteristic or function; and/or qualify another verb by expressing one or more of an ability, capability, or possibility associated with the qualified verb. Accordingly, usage of “may” and “may be” indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms “may” and “may be.”

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. An application apparatus for a coatings material, comprising:
- a supporting element extending along a first axis and having a first end and a second end;
- a first arm coupled to the first end of the supporting element;
- a second arm coupled to the second end of the supporting element; and
- a first fastener attached to, and movable with respect to, the first end of the supporting element and detachably fixed to the first arm, wherein the first arm is configured to slide along the first axis.

2. The application apparatus of claim 1, wherein the supporting element comprises an elongate body having a first open slot opening to the first end of the supporting element, wherein the first open slot is configured to receive the first fastener.

3. The application apparatus of claim 1, further comprising a second fastener extending through the first arm, wherein the supporting element comprises an elongate body having a first closed slot proximate to the first end of the supporting element, wherein the second fastener extends into the first closed slot of the supporting element, wherein the first arm is configured to slide along the first axis when the second fastener is in a tightened configuration.

4. The application apparatus of claim 1, wherein the first arm comprises a first roller support portion that extends in a first direction away from the supporting element, and a first spindle pin fixed to the first roller support portion and projecting away from the first roller support portion and toward the second arm, and wherein the second arm comprises a second roller support portion that extends in the first direction away from the supporting element, and a second spindle pin fixed to the second roller support portion and projecting away from the second roller support portion and toward the first arm.

5. The application apparatus of claim 4, further comprising a central connector operably connected to the supporting element and comprising an applicator connector portion sized for receiving an extension tool, wherein the applicator connector portion extends away from the supporting element along a second axis perpendicular to the first axis, wherein the first and second axes define a first plane, wherein the first direction intersects with the first plane.

6. The application apparatus of claim 1, further comprising a third fastener attached to, and movable with respect to, the second end of the supporting element and detachably fixed to the second arm, wherein the second arm is configured to slide along the first axis.

7. The application apparatus of claim 6, wherein the supporting element has a second open slot opening to the second end of the supporting element and a second closed slot proximate to the second end of the supporting element, wherein the second open slot is configured to receive the third fastener.

8. The application apparatus of claim 1, further comprising a fastener receiving element configured to receive the first fastener, and wherein the first end of the supporting element is configured to receive the fastener receiving element such that when the first fastener is in a tightened configuration, the supporting element is secured between the fastener receiving element and the first arm.

9. An application apparatus for a coatings material comprising:

a supporting element extending between a first end and a second end;

a first arm coupled to the first end of the supporting element;

a second arm coupled to the second end of the supporting element;

a first fastener detachably fixed to the first arm allowing the first arm to slide along the supporting element; and a second fastener detachably fixed to the second arm allowing the second arm to slide along the supporting element.

10. The application apparatus of claim 9, further comprising a fastener receiving element configured to receive the first fastener, wherein the supporting element is configured to receive the fastener receiving element such that the supporting element is arranged between the fastener receiving element and the first arm when the first arm, the fastener receiving element, and the first fastener are fixed at a location on the supporting element.

11. The application apparatus of claim 10, further comprising a retaining clip coupled to the first fastener, wherein the first fastener extends through the first arm and the fastener receiving element, and wherein the first fastener is detachably fixed to the first arm and the fastener receiving element by way of the retaining clip.

12. The application apparatus of claim 11, wherein the first fastener comprises a threaded region and an unthreaded region, and wherein the retaining clip is arranged on the unthreaded region of the first fastener.

13. The application apparatus of claim 10, wherein the first fastener extends through a first hole in the fastener receiving element and extends through a second hole in the first arm, wherein the first hole is threaded, and wherein the second hole is unthreaded.

14. The application apparatus of claim 13, wherein the first fastener comprises a threaded region and an unthreaded region; wherein the first fastener is configured to move between a tightened configuration and an untightened configuration; wherein when the first fastener is in the tightened configuration, the threaded region of the first fastener is mated with the threads of the first hole of the fastener receiving element; and wherein when the first fastener is in the untightened configuration, the first fastener may spin freely within the first hole and the second hole while remaining detachably fixed to the first arm.

15. The application apparatus of claim 9, further comprising a third fastener configured to extend through the first arm, wherein the supporting element further comprises a second slot proximate to the first end, and wherein the third fastener is configured to extend through the second slot.

16. The application apparatus of claim 15, wherein when the first and third fasteners are both in a tightened configuration to fix the first arm at a desired position on the supporting element, the first and third fasteners are completely spaced apart from one another.

17. An application apparatus for a coatings material comprising:

a supporting element having first and second ends, a first open slot opening to the first end, and a first closed slot proximate to the first end;

a first arm operably connected to the first end of the supporting element;

a second arm operably connected to the second end of the supporting element opposite to the first end;

a fastener receiving element arranged within the first arm;

a first fastener extending through the first arm and first closed slot of the supporting element for coupling the first arm to the supporting element; and a second fastener extending through the first arm, the first open slot of the supporting element, and the fastener receiving element for holding the first arm in position, wherein when the first arm is coupled to the supporting element, the fastener receiving element is arranged within and surrounded by the first end of the supporting element.

18. The application apparatus of claim 17, wherein the first fastener is spaced apart from the fastener receiving element when the first arm is coupled to the supporting element.

19. The application apparatus of claim 17, wherein the first arm comprises a first hole configured to receive the first fastener, wherein the first hole is threaded and configured to receive and mate with threads of the first fastener, wherein the first arm comprises a second hole opposite to the first hole and configured to receive the second fastener, and wherein the second hole is unthreaded.

20. The application apparatus of claim 17, wherein the first arm is configured to slide along the support element to increase or decrease the distance between the first arm and the second arm, and wherein the distance that the first arm can slide along the support element is based on the length of the first closed slot.

* * * * *